United States Patent
Ko et al.

(10) Patent No.: US 12,371,095 B2
(45) Date of Patent: Jul. 29, 2025

(54) STEER-BY-WIRE STEERING APPARATUS

(71) Applicant: HL MANDO CORPORATION, Gyeonggi-do (KR)

(72) Inventors: Kyung Min Ko, Gyeonggi-do (KR); Sang Hee Ahn, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 712 days.

(21) Appl. No.: 17/771,860

(22) PCT Filed: Oct. 23, 2020

(86) PCT No.: PCT/KR2020/014562
§ 371 (c)(1),
(2) Date: Apr. 26, 2022

(87) PCT Pub. No.: WO2021/085945
PCT Pub. Date: May 6, 2021

(65) Prior Publication Data
US 2022/0410963 A1    Dec. 29, 2022

(30) Foreign Application Priority Data
Oct. 31, 2019   (KR) ................. 10-2019-0137585

(51) Int. Cl.
*B62D 5/04*   (2006.01)
(52) U.S. Cl.
CPC ................... *B62D 5/0403* (2013.01)
(58) Field of Classification Search
CPC .................................... B62D 5/0403
USPC ................................... 180/443, 444
See application file for complete search history.

(56) References Cited

U.S. PATENT DOCUMENTS

| | | |
|---|---|---|
| 2013/0126261 A1 | 5/2013 | Jung et al. |
| 2014/0305731 A1 | 10/2014 | Ko et al. |
| 2014/0311263 A1 | 10/2014 | Washnock et al. |

(Continued)

FOREIGN PATENT DOCUMENTS

| | | |
|---|---|---|
| CN | 104100692 | 10/2014 |
| CN | 106995004 | 8/2017 |
| DE | 10 2014 005 687 | 10/2014 |

(Continued)

OTHER PUBLICATIONS

International Search Report for PCT/KR2020/014562 mailed on Jan. 29, 2021 and its English Translation from WIPO (now published as WO 2021/085945).

(Continued)

*Primary Examiner* — Jacob D Knutson
(74) *Attorney, Agent, or Firm* — WOMBLE BOND DICKINSON (US) LLP

(57) ABSTRACT

The present embodiments may provide a steer-by-wire steering apparatus which enables a driver to use a function for controlling an automobile, such as automatic parking, lane keeping, driving assistance according to a road surface condition, steering-vibration damping, or autonomous driving control, to improve the driver's convenience, and allows removal of hydraulic pressure-related components to prevent consumption of engine power by the components and thus can satisfy the high power and rigidity required for a steering device of a commercial vehicle.

11 Claims, 9 Drawing Sheets

(56) References Cited

U.S. PATENT DOCUMENTS

2019/0300048 A1  10/2019  Kaufman

FOREIGN PATENT DOCUMENTS

| DE | 102015217045 A1 | * | 3/2017 | ........... B62D 5/0403 |
| DE | 10 2017 200 141 | | 7/2017 | |
| JP | 2006-143029 | | 6/2006 | |
| JP | 2009-202864 | | 9/2009 | |
| JP | 2017144960 A | * | 8/2017 | ............... B62D 3/02 |
| KR | 10-1400488 | | 5/2014 | |
| KR | 101400488 B1 | * | 5/2014 | |
| KR | 10-2015-0012827 | | 2/2015 | |
| KR | 2015012827 A | * | 2/2015 | |
| KR | 10-2017-0088289 | | 8/2017 | |
| KR | 10-2019-0112062 | | 10/2019 | |

OTHER PUBLICATIONS

Written Opinion of the International Searching Authority for PCT/KR2020/014562 mailed on Jan. 29, 2021 and its English Translation by Google Translate (now published as WO 2021/085945).

Office Action dated Nov. 25, 2023 for Chinese Patent Application No. 202080076109.7 and its English translation by Google translate.

International Preliminary Report on Patentability (Chapter I) for PCT/KR2020/014562 mailed on May 3, 2022 and its English Translation from WIPO (now published as WO 2021/085945).

Office Action dated Mar. 7, 2025 for German Patent Application No. 11 2020 005 386.5 and its English translation by Google Translate.

* cited by examiner

STEER-BY-WIRE STEERING APPARATUS

CROSS-REFERENCE TO RELATED APPLICATIONS

The present application is the national stage of International Patent Application No. PCT/KR2020/014562 filed on Oct. 23, 2020, which claims the priority to Korean Patent Application No. 10-2019-0137585 filed in the Korean Intellectual Property Office on Oct. 31, 2019, the entire contents of which are incorporated herein by reference.

TECHNICAL FIELD

The present embodiments relate to a steer-by-wire steering device and, more specifically, a steer-by-wire steering device that may make use of the vehicle controlling functions of autonomous parking, lane keeping, driving assistance according to the road condition, attenuation of steering vibration, and autonomous driving control, etc, thereby increasing the driver's convenience, does not consume engine power by excluding hydraulic pressure-related components, and may meet high power and rigidity required for the steering device for commercial vehicles.

BACKGROUND ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

However, in the conventional steer-by-wire steering device typically, the structure of steering wheels by including a worm-worm wheel structure and a rack-pinion structure is complicated to control, is disadvantageous in view of costs due to many related components, and has difficulty in implementing high power due to low component rigidity. Thus, the conventional steer-by-wire steering device may be appropriate for passenger cars but not for commercial vehicles, such as buses or trucks.

DETAILED DESCRIPTION OF THE INVENTION

Technical Problem

The present embodiments have been conceived in the foregoing background and may provide a steer-by-wire steering device that may make use of the vehicle controlling functions of autonomous parking, lane keeping, driving assistance according to the road condition, attenuation of steering vibration, and autonomous driving control, etc, thereby increasing the driver's convenience, does not consume engine power by excluding hydraulic pressure-related components, and may meet high power and rigidity required for the steering device for commercial vehicles.

Technical Solution

According to the present embodiments, there may be provided a steer-by-wire steering device, comprising a hollow housing having a first gear portion formed on an inner circumferential surface thereof, a first gear member including a large diameter portion having a second gear portion formed on an outer circumferential surface thereof and a small diameter portion having a third gear portion formed on an outer circumferential surface thereof, coupled to the housing as the first gear portion and the second gear portion are engaged with each other, and rotated by a motor coupled to a side of the housing, and a second gear member including a hollow portion having a fourth gear portion formed on an inner circumferential surface thereof and a coupling portion axially protruding to couple with a pitman arm and having the hollow portion coupled with the small diameter portion inside of the housing as the third gear portion is engaged with the fourth gear portion.

Advantageous Effects

According to the present embodiments, it is possible to make use of the vehicle controlling functions of autonomous parking, lane keeping, driving assistance according to the road condition, attenuation of steering vibration, and autonomous driving control, etc, thereby increasing the driver's convenience, does not consume engine power by excluding hydraulic pressure-related components, and may meet high power and rigidity required for the steering device for commercial vehicles.

MODE FOR CARRYING OUT THE INVENTION

Figure 1:
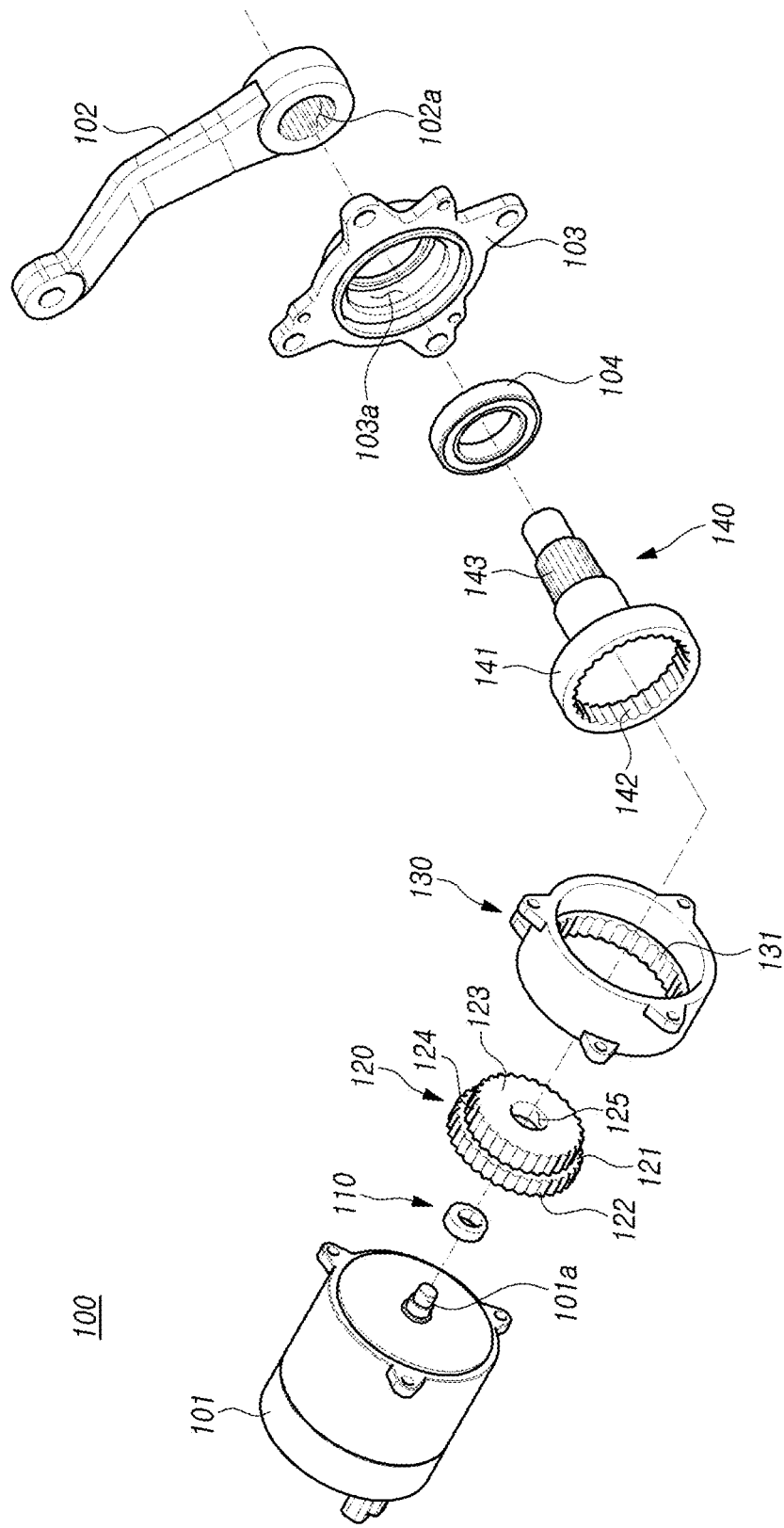
FIGS. 1 and 2 are exploded perspective views illustrating a steer-by-wire steering device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
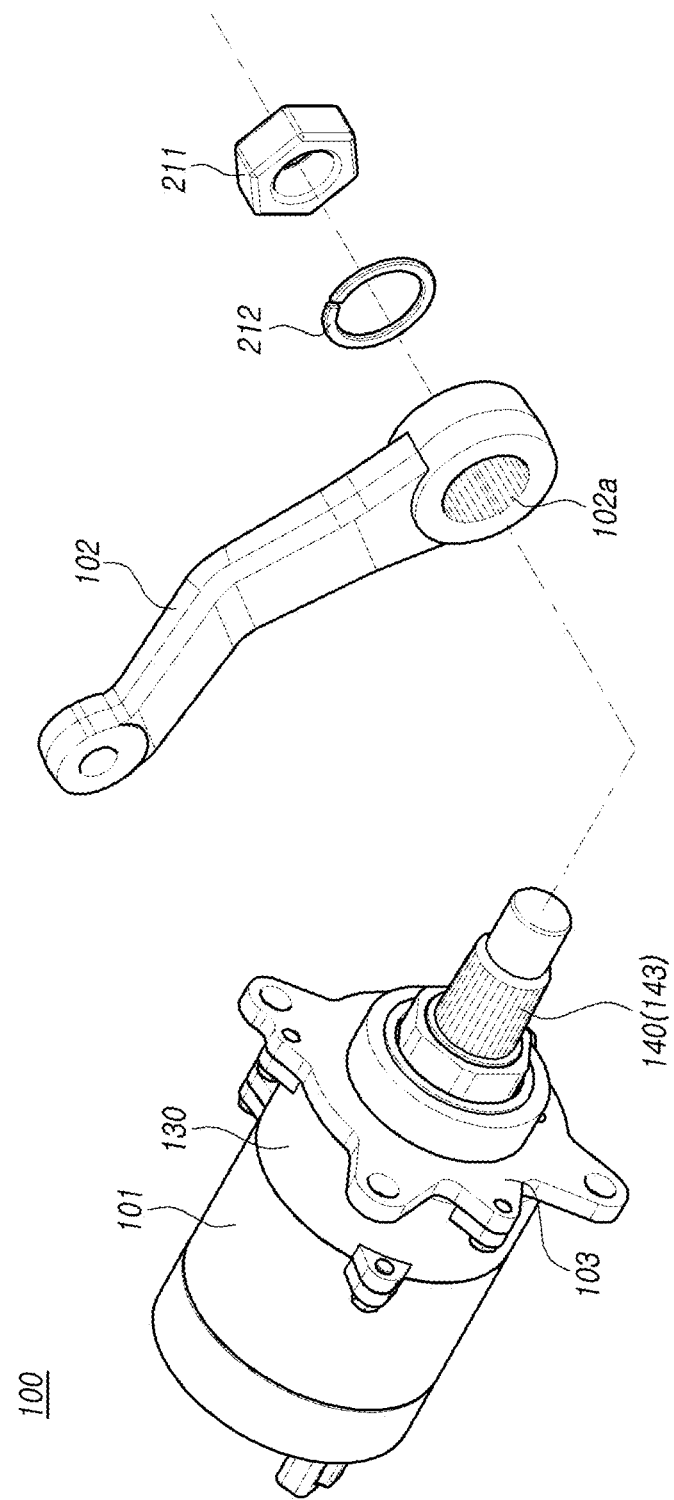
Figure 3:
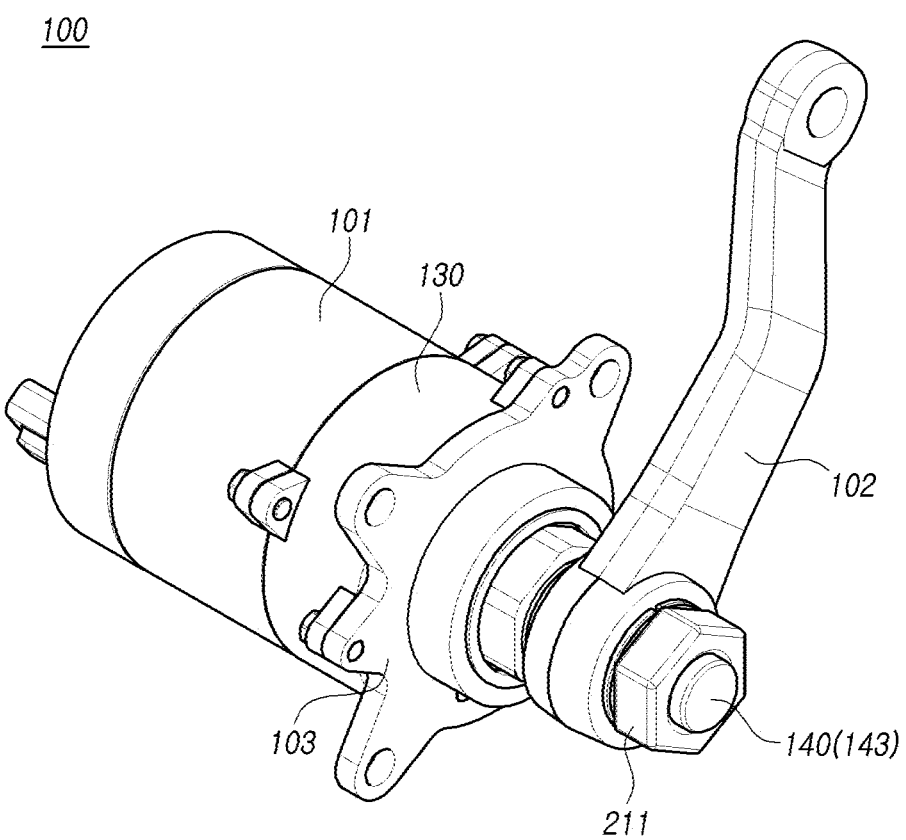
FIG. 3 is a perspective view illustrating an assembled state FIG. 1.
Figure 4:
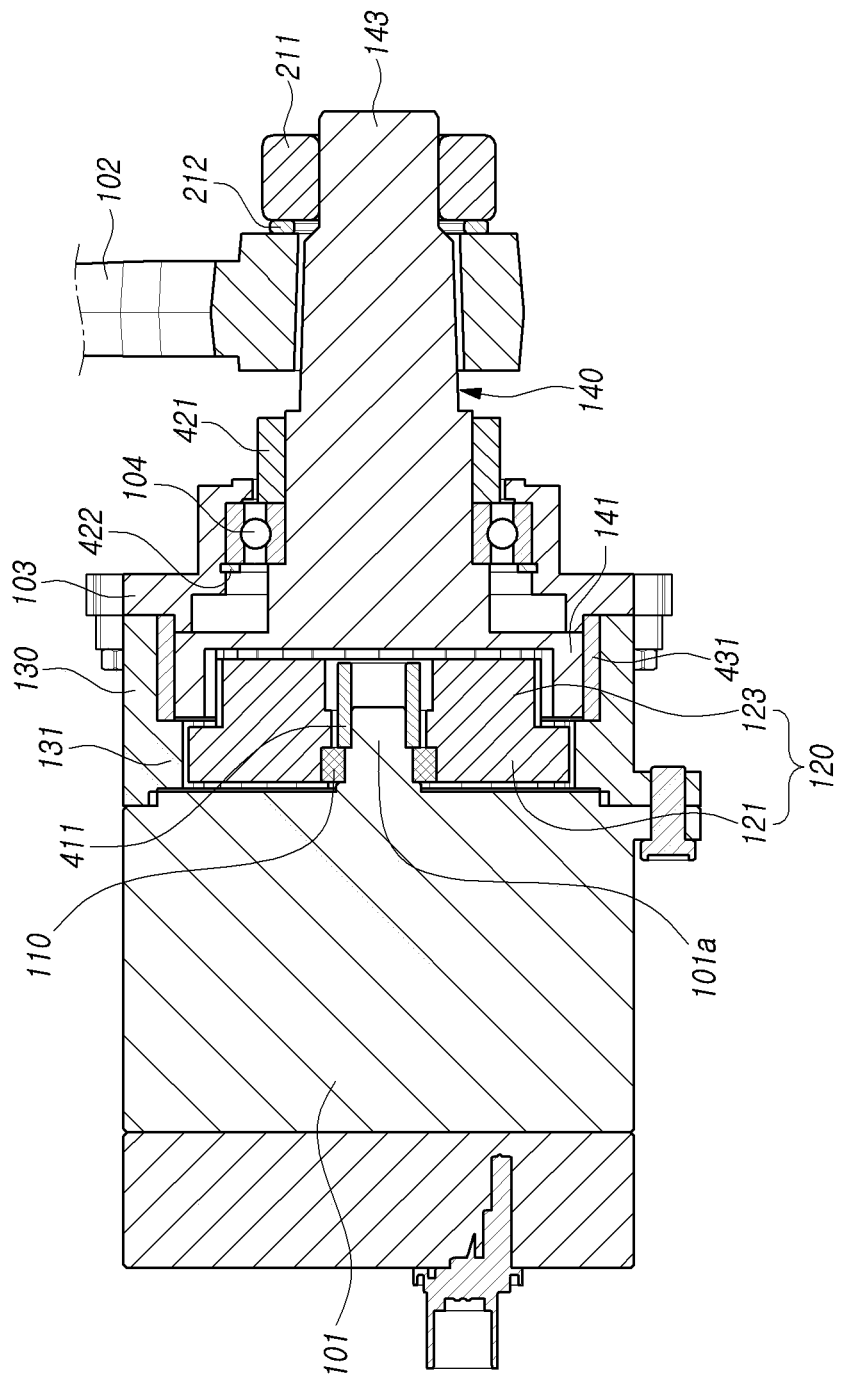
FIG. 4 is a cross-sectional view of FIG. 3.
Figure 5:
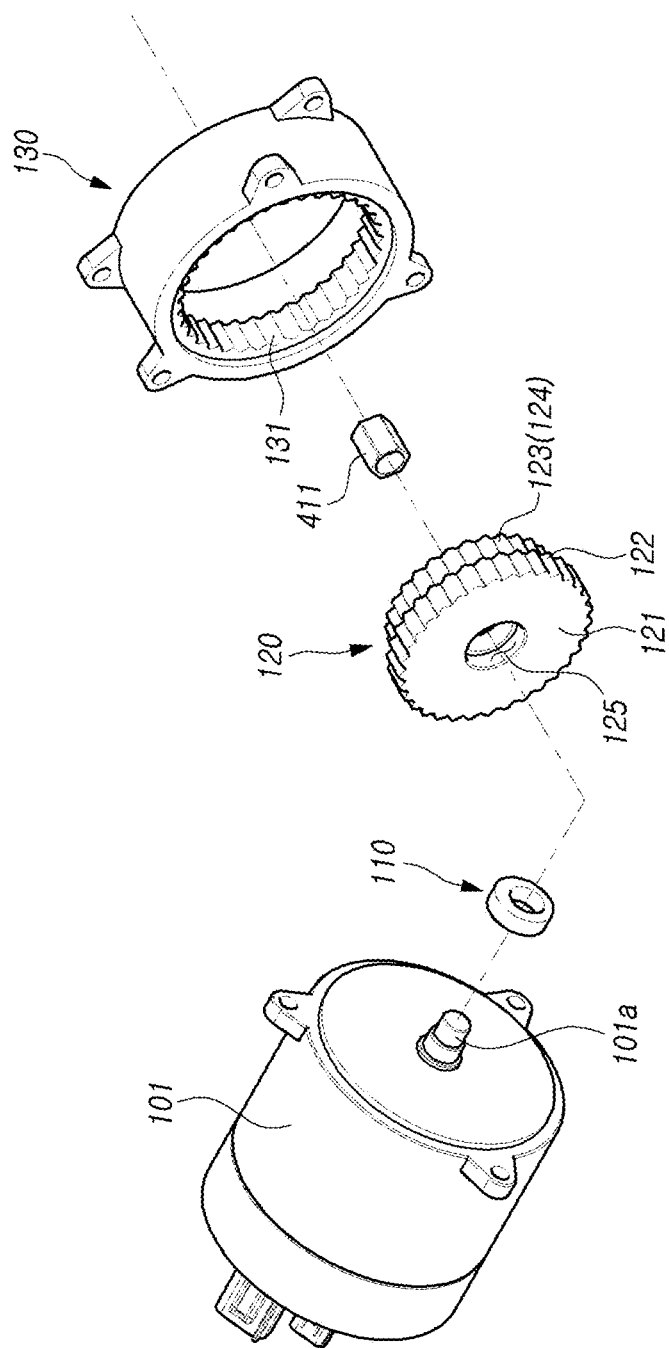
FIG. 5 is an exploded perspective view illustrating a portion of a steer-by-wire steering device according to the present embodiments.
Figure 6:
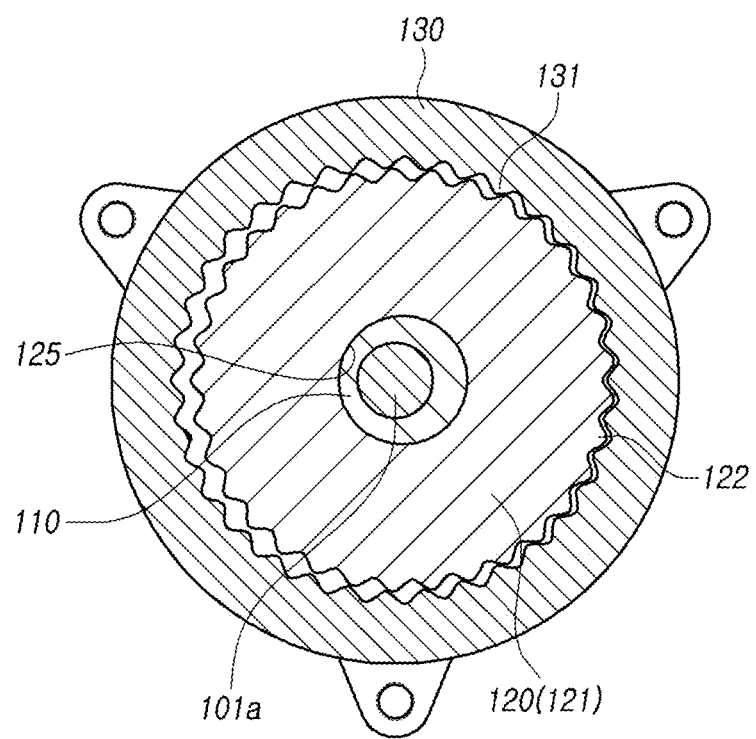
FIG. 6 is a cross-sectional view illustrating a steer-by-wire steering device according to the present embodiments.
Figure 7:
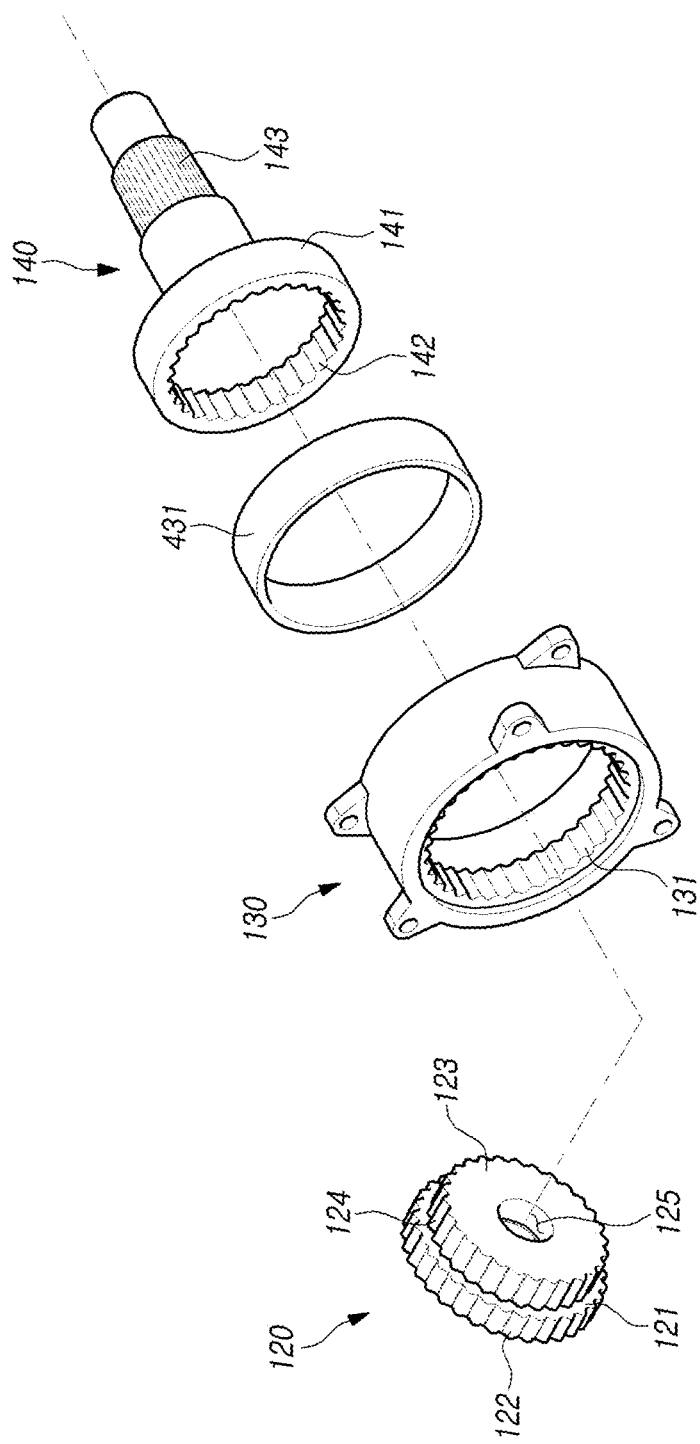
FIG. 7 is an exploded perspective view illustrating a portion of a steer-by-wire steering device according to the present embodiments.
Figure 8:
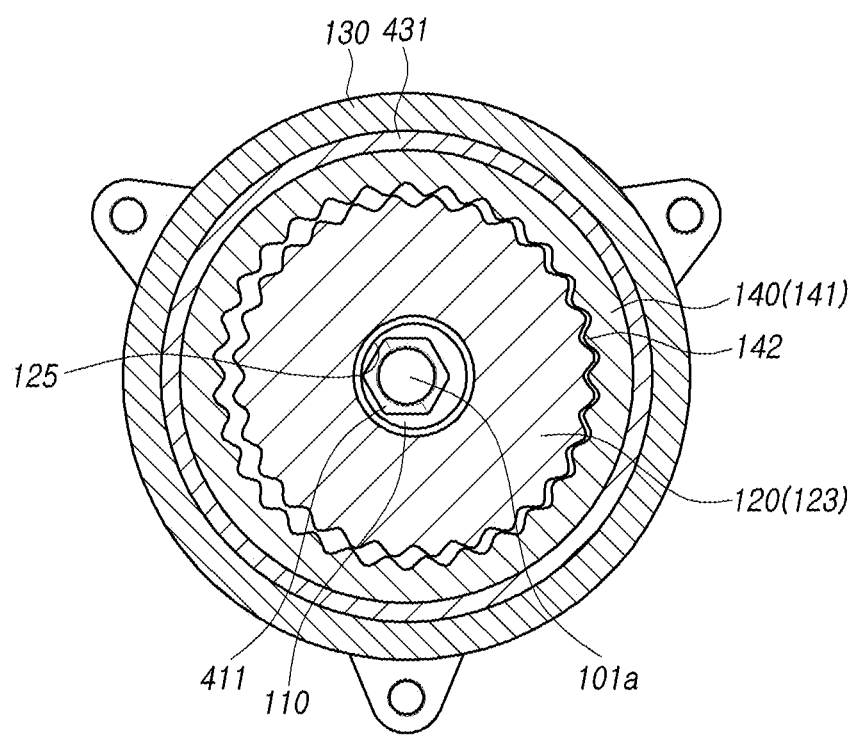
FIG. 8 is a cross-sectional view illustrating a steer-by-wire steering device according to the present embodiments.
Figure 9:
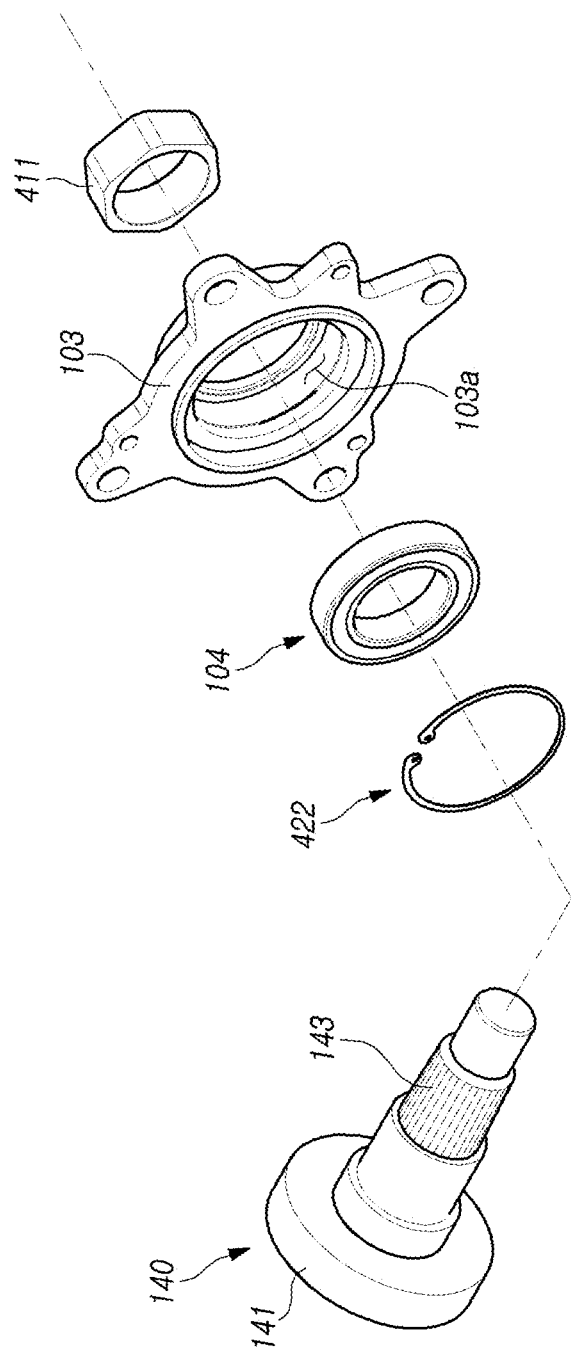
FIG. 9 is an exploded perspective view illustrating a portion of a steer-by-wire steering device according to an embodiment.

FIGS. 1 and 2 are exploded perspective views illustrating a steer-by-wire steering device according to the present embodiments. FIG. 3 is a perspective view illustrating an assembled state FIG. 1. FIG. 4 is a cross-sectional view of FIG. 3. FIG. 5 is an exploded perspective view illustrating a portion of a steer-by-wire steering device according to the present embodiments. FIG. 6 is a cross-sectional view illustrating a steer-by-wire steering device according to the present embodiments. FIG. 7 is an exploded perspective view illustrating a portion of a steer-by-wire steering device according to the present embodiments. FIG. 8 is a cross-sectional view illustrating a steer-by-wire steering device according to the present embodiments. FIG. 9 is an exploded perspective view illustrating a portion of a steer-by-wire steering device according to an embodiment.

A steer-by-wire steering device 100 according to the present embodiments includes a hollow housing 130 having a first gear portion 131 formed on an inner circumferential surface thereof, a first gear member 120 including a large diameter portion 121 having a second gear portion 122 formed on an outer circumferential surface thereof and a small diameter portion 123 having a third gear portion 124 formed on an outer circumferential surface thereof, coupled to the housing 130 as the first gear portion 131 and the second gear portion 122 are engaged with each other, and rotated by a motor 101 coupled to a side of the housing 130, and a second gear member 140 including a hollow portion 141 having a fourth gear portion 142 formed on an inner circumferential surface thereof and a coupling portion 143 axially protruding to couple with a pitman arm 102 and having the hollow portion 141 coupled with the small diameter portion 123 inside of the housing 130 as the third gear portion 124 is engaged with the fourth gear portion 142.

A sensor for sensing, e.g., the steering angle or steering torque according to the driver's manipulation of the steering wheel is provided on the steering shaft, and an electronic control unit (not shown) controls the motor 101 based on the information sensed by the sensor.

The torque of the motor 101 is amplified by deceleration by the first gear member 120 and the second gear member 140, rotating the pitman arm 102. A link (not shown) connected with the tie rod or knuckle arm is coupled to an end of the pitman arm 102, and the wheel is steered by rotation of the pitman arm 102.

Accordingly, it is possible to meet the high power and rigidity by amplifying the torque of the motor without using hydraulic components consuming engine power, such as a hydraulic pump and hydraulic line, and low-rigidity worm/worm wheel or rack/pinion structure. Further, it is possible to implement the functions of autonomous parking, lane keeping, driving reporting according to the road condition, attenuation of steering vibration, and autonomous driving control by the control of the electronic control unit.

Referring to FIG. 1, the motor 101 and the pitman arm 102 are connected by the first gear member 120 and the second gear member 140.

The housing 130 is formed to be hollow, has the first gear portion 131 formed on the inner circumferential surface thereof, and is coupled to the motor 101 on one side thereof.

Inside the housing 130 are coupled the first gear member and the second gear member 140, transferring the torque of the motor 101 to the pitman arm 102.

The first gear member 120 includes the large diameter portion 121 and the small diameter portion 123. The second gear portion 122 engaged with the first gear portion 131 is formed on the outer circumferential surface of the large diameter portion 121 so that the first gear member 120 is coupled to the housing 130. The small diameter portion 123 has the third gear portion 124 formed on the outer circumferential surface thereof.

The second gear member 140 includes the hollow portion 141 and the coupling portion 143. The hollow portion 141 has a fourth gear portion 142, engaged with the third gear portion 124, formed on the inner circumferential surface of the hollow portion 141 so that the hollow portion 141 is coupled with the small diameter portion 123, inside the housing 130, and the coupling portion 143 protrudes axially to couple with the pitman arm 102.

As is described below, the cover member 103 has an insertion hole 103a through which the coupling portion 143 passes. The coupling portion 143 is inserted into the insertion hole 103a, and the cover member 103 is coupled to another side of the housing 130.

In other words, the motor 101 and the cover member 103 are coupled to the one side and the other side, respectively, of the housing 130, and the first gear member 120 and the second gear member 140 are received in the housing 130.

Referring to FIGS. 2 and 3, the pitman arm 102 is fitted over the portion of the coupling portion 143, which passes through the insertion hole 103a and protrudes to the other side.

The pitman arm 102 has a coupling hole 102a into which the coupling portion 143 is inserted. The coupling portion 143 and the coupling hole 102a may have serrations engaged with each other to be circumferentially fixed.

Further, a first fixing member 211 axially supported on the pitman arm 102 is coupled to the outer circumferential surface of the coupling portion 143 to fix the pitman arm 102. The first fixing member 211 may be, e.g., a nut.

Further, as shown in the drawings, a washer 212 may further be provided between the pitman arm 102 and the first fixing member 211 to reinforce the coupling force and preventing loosening.

A structure in which the torque of the motor 101 is decelerated is described below with reference to FIGS. 4 to 9.

Referring to FIG. 4, as is described below, the motor shaft 101a of the motor 101 and the first gear member 120 are coupled via a rotation supporting member 110. As the rotation supporting member 110 is formed in an eccentric structure, and the outer diameter of the large diameter portion 121 is formed to be smaller than the inner diameter of the housing 130, the first gear portion 131 and the second gear portion 122 are engaged with each other, and the first gear member 120 is eccentrically rotated.

As the first gear member 120 is eccentrically rotated, and the outer diameter of the small diameter portion 123 is formed to be smaller than the inner diameter of the hollow portion 141, the third gear portion 124 and the fourth gear portion 142 are engaged with each other, and the second gear member 140 is rotated coaxially with the motor shaft 101a.

As such, the torque of the motor 101 is decelerated by the eccentric rotating structure of the first gear member 120 and is transferred to the pitman arm 102.

Referring to FIGS. 5 and 6, the first gear member 120 has a coupling aperture 125 into which the motor shaft 101a of the motor 101 is inserted, and an annular rotation supporting member 110 having different central axes for the inner circumferential surface and outer circumferential surface thereof is provided between the inner circumferential surface of the first gear member 120 and the outer circumferential surface of the motor shaft 101a.

In other words, as the rotation supporting member 110 is formed in an eccentric structure, and the motor shaft 101a is rotated, a circumferential slide occurs between the inner circumferential surface of the rotation supporting member 110 and the outer circumferential surface of the motor shaft 101a and between the outer circumferential surface of the rotation supporting member 110 and the inner circumferential surface of the first gear member 120, and the first gear member 120 is rotated by the motor 101.

In other words, the rotation supporting member 110 is formed in an eccentric structure and, although not shown in the drawings, may be coupled to be circumferentially fixed to the motor shaft 101a by, e.g., serrations.

As the motor shaft 101a rotates, a slide occurs between the outer circumferential surface of the rotation supporting member 110 and the inner circumferential surface of the first gear member 120 so that the first gear member 120 is eccentrically rotated.

Although not shown in the drawings, a bearing may be provided between the outer circumferential surface of the rotation supporting member 110 and the inner circumferential surface of the first gear member 120.

Meanwhile, a second fixing member 411 axially supported on the rotation supporting member 110 is coupled to the motor shaft 101a to axially support the rotation supporting member 110. The second fixing member 411 may be, e.g., a nut.

The outer diameter of the large diameter portion 121 is formed to be smaller than the inner diameter of the housing 130 so that as the first gear member 120 is eccentrically rotated, the first gear portion 131 and the second gear portion 122 are engaged with each other, only on any one circumferential side.

Further, as the first gear portion 131 and the second gear portion 122 are formed of cycloid gears, the first gear member 120 eccentrically rotated rotate and revolve, and the torque of the motor 101 is decelerated due to a difference between the rotation period and the revolution period.

Referring to FIGS. 7 and 8, the outer diameter of the small diameter portion 123 is formed to be smaller than the inner diameter of the hollow portion 141, so that, as the first gear member 120 is eccentrically rotated, the third gear portion 124 and the fourth gear portion 142 are engaged with each other, only on any one circumferential side.

Further, the third gear portion 124 and the fourth gear portion 142 are formed of cycloid gears so that as the first gear member 120 rotates and revolves while eccentrically rotating, the second gear member 140 is rotated coaxially with the motor shaft 101a.

Further, a bushing member 431 supporting the rotation of the second gear member 140 is provided between the hollow portion 141 and the housing 130, and the bushing member 431 fixes the central axis of the second gear member 140.

Referring to FIGS. 4 and 9, as described above, the cover member 103 coupled to the other side of the housing 130 has the insertion hole 103a through which the coupling portion 143 passes, and the bearing 104 may be coupled between the coupling portion 143 and the cover member 103.

In other words, rotation of the second gear member 140 is supported by the bushing member 431 and the bearing 104.

As shown in the drawings, the outer ring of the bearing 104 may be axially fixed by a snap ring 422 coupled to the inner circumferential surface of the cover member 103, and the inner ring of the bearing 104 may be axially fixed by a third fixing member 421 coupled to the outer circumferential surface of the coupling portion 143. The third fixing member 421 may be, e.g., a nut.

The so-shaped steer-by-wire steering device may make use of the vehicle controlling functions of autonomous parking, lane keeping, driving assistance according to the road condition, attenuation of steering vibration, and autonomous driving control, etc, thereby increasing the driver's convenience, does not consume engine power by excluding hydraulic pressure-related components, and may meet high power and rigidity required for the steering device for commercial vehicles.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority to Korean Patent Application No. 10-2019-0137585 filed in the Korean Intellectual Property Office on Oct. 31, 2019, the disclosure of which is incorporated by reference herein in its entirety.

The invention claimed is:

1. A steer-by-wire steering device, comprising:
a hollow housing having a first gear portion formed on an inner circumferential surface thereof;
a first gear member including a large diameter portion having a second gear portion formed on an outer circumferential surface thereof and a small diameter portion having a third gear portion formed on the outer circumferential surface thereof, coupled to the housing as the first gear portion and the second gear portion are engaged with each other, and rotated by a motor coupled to a side of the housing; and
a second gear member including a hollow portion having a fourth gear portion formed on an inner circumferential surface thereof and a coupling portion axially protruding to couple with a pitman arm and having the hollow portion coupled with the small diameter portion inside of the housing as the third gear portion is engaged with the fourth gear portion,
wherein the pitman arm has a coupling hole into which the coupling portion is inserted, and a coupling part and the coupling hole are serrated to be engaged with each other.

2. The steer-by-wire steering device of claim 1, wherein the first gear member has a coupling aperture into which a motor shaft of the motor is inserted, and
wherein an annular rotation supporting member having different central axes for an inner circumferential surface and outer circumferential surface thereof is provided between an inner circumferential surface of the first gear member and an outer circumferential surface of the motor shaft.

3. The steer-by-wire steering device of claim 2, wherein an outer diameter of the large diameter portion is formed to be smaller than an inner diameter of the housing.

4. The steer-by-wire steering device of claim 3, wherein the first gear portion and the second gear portion are cycloid gears.

5. The steer-by-wire steering device of claim 2, wherein an outer diameter of the small diameter portion is formed to be smaller than an inner diameter of the hollow portion.

6. The steer-by-wire steering device of claim 5, wherein the third gear portion and the fourth gear portion are cycloid gears.

7. The steer-by-wire steering device of claim 2, wherein a bushing member supporting rotation of the second gear member is provided between the hollow portion and the housing.

8. The steer-by-wire steering device of claim 2, wherein a cover member is coupled to another side of the housing, and wherein the cover member has an insertion hole through which the coupling portion passes.

9. The steer-by-wire steering device of claim 8, wherein a bearing is coupled between the coupling portion and the cover member.

10. A steer-by-wire steering device, comprising:
a hollow housing having a first gear portion formed on an inner circumferential surface thereof:
a first gear member including a large diameter portion having a second gear portion formed on an outer circumferential surface thereof and a small diameter portion having a third gear portion formed on the outer circumferential surface thereof, coupled to the housing as the first gear portion and the second gear portion are engaged with each other, and rotated by a motor coupled to a side of the housing; and
a second gear member including a hollow portion having a fourth gear portion formed on an inner circumferential surface thereof and a coupling portion axially protruding to couple with a pitman arm and having the hollow portion coupled with the small diameter portion inside of the housing as the third gear portion is engaged with the fourth gear portion,
wherein a first fixing member axially supported on the pitman arm is coupled to an outer circumferential surface of the coupling portion.

11. A steer-by-wire steering device comprising:
a hollow housing having a first gear portion formed on an inner circumferential surface thereof:
a first gear member including a large diameter portion having a second gear portion formed on an outer circumferential surface thereof and a small diameter portion having a third gear portion formed on the outer circumferential surface thereof, coupled to the housing as the first gear portion and the second gear portion are engaged with each other, and rotated by a motor coupled to a side of the housing; and
a second gear member including a hollow portion having a fourth gear portion formed on an inner circumferential surface thereof and a coupling portion axially protruding to couple with a pitman arm and having the hollow portion coupled with the small diameter portion inside of the housing as the third gear portion is engaged with the fourth gear portion,
wherein the first gear member has a coupling aperture into which a motor shaft of the motor is inserted,
wherein an annular rotation supporting member having different central axes for an inner circumferential surface and outer circumferential surface thereof is provided between an inner circumferential surface of the first gear member and an outer circumferential surface of the motor shaft, and
wherein a second fixing member axially supported on the rotation supporting member is coupled to the motor shaft.

* * * * *